United States Patent
Kiraly et al.

(10) Patent No.: US 8,233,964 B2
(45) Date of Patent: Jul. 31, 2012

(54) SYSTEM AND METHOD FOR COLOR-CODING SEGMENTED CHEST IMAGE AIRWAYS FOR ASSESSMENT

(75) Inventors: Atilla Peter Kiraly, Plainsboro, NJ (US); Benjamin Odry, West New York, NJ (US); Carol L. Novak, Newtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 699 days.

(21) Appl. No.: 11/470,287

(22) Filed: Sep. 6, 2006

(65) Prior Publication Data

US 2007/0071301 A1 Mar. 29, 2007

Related U.S. Application Data

(60) Provisional application No. 60/717,629, filed on Sep. 16, 2005.

(51) Int. Cl.
*A61B 5/05* (2006.01)
(52) U.S. Cl. ........ 600/425; 600/407; 600/529; 382/128; 382/131; 382/164
(58) Field of Classification Search .................. 382/131, 382/128, 164, 130, 132; 600/407, 529, 425
See application file for complete search history.

(56) References Cited

U.S. PATENT DOCUMENTS

| | | | | |
|---|---|---|---|---|
| 6,366,800 | B1 * | 4/2002 | Vining et al. ................ | 600/425 |
| 2002/0028006 | A1 * | 3/2002 | Novak et al. ................ | 382/128 |
| 2005/0018888 | A1 * | 1/2005 | Zonneveld .................. | 382/128 |
| 2005/0196024 | A1 * | 9/2005 | Kuhnigk ..................... | 382/128 |
| 2005/0240094 | A1 | 10/2005 | Pichon et al. | |
| 2006/0023925 | A1 | 2/2006 | Kiraly et al. | |
| 2006/0030958 | A1 * | 2/2006 | Tschirren et al. ............ | 700/90 |
| 2006/0280351 | A1 * | 12/2006 | Luping et al. ................ | 382/128 |

OTHER PUBLICATIONS

Aoyama M., Kawashita I., Naruse Y., Asada N., and Awai K., "Automated Cerebral Arteries Segmentation and Diameter Measurement of Aneurysm from MR Angiograms", Lecture Notes in Compter Science, vol. 2774, pp. 402-409, Oct. 21, 2003.*
Odry B.L., Kiraly A.P., Novak C. L., Naidich D.P., Lerallut J-F, "A Visualization Tool for Global Assessment of Bronchiectasis and Local Evaluation of the Airways", European Medical & Biological Engineering Conference EMBEC'05 Proceedings; Prague, Nov. 2005.
A.P. Kiraly, E. A. Hoffman, G. McLennan, W. E. Higgins, and J.M. Reinhardt, "Three-dimensional Human Airway Segmentation Methods for Clinical Virtual Bronchscopy," Academic Radiology, vol. 9, No. 10, pp. 1153-1168, Oct. 2002.
C.I. Fetita, F. Preteux, C. Beigelman-Aubry, and P. Grenier, "Pulmonary Airways: 3-D Reconstruction from Multislice CT and Clinical Investigation," vol. 23, No. 11, *IEEE Trans. Medical Imaging*, Nov. 2004.
A.P. Kiraly, J.M. Reinhardt, E.A. Hoffman, G. McLennan, and W.E. Higgins, "Virtual Bronchoscopy for Quantitative Airway Analysis," *SPIE Medical Imaging 2005: Physiology, Function, and Structure from Medical Images*, SPIE Proceedings vol. 5746, Feb. 2005.
S. Matsuoka, Y. Kubrihara, Y. Nakajima, H. Niimi, H. Ashida, and K. Kaneoya, "Serial Change in Airway Lumen and Wall Thickness at Thin-Section CT in Aymptomatic Subjects," *Radiology*, Dec. 10, 2004.

(Continued)

*Primary Examiner* — Brian Casler
*Assistant Examiner* — Joseph M Santos

(57) ABSTRACT

A method for visualizing airways in chest images, includes: computing a distance map of a segmented bronchial tree; extracting data from the segmented bronchial tree using the distance map; and visualizing a three-dimensional (3D) image of the segmented bronchial tree color-coded according to the extracted data.

6 Claims, 4 Drawing Sheets

OTHER PUBLICATIONS

E Pichon, CL Novak, AP Kiraly, DD Naidich, "A novel method for pulmonary emboli visualization from high-resolution CT images," *SPIE Medical Imaging 2004*, 5367, 2004.

A.P. Kiraly, J.P. Helferty, E.A. Hoffman, G. McLennan, and W.E. Higgins, "Three-Dimensional Path Planning for Virtual Bronchoscopy,", vol. 23, No. 11, *IEEE Trans. Medical Imaging*, Nov. 2004.

* cited by examiner

SYSTEM AND METHOD FOR COLOR-CODING SEGMENTED CHEST IMAGE AIRWAYS FOR ASSESSMENT

CROSS-REFERENCE TO RELATED APPLICATION

This application claims the benefit of U.S. Provisional Application No. 60/717,629, filed Sep. 16, 2005, a copy of which is herein incorporated by reference.

BACKGROUND OF THE INVENTION

1. Technical Field

The present invention relates to medical image processing, and more particularly, to a system and method for visualizing airways for assessment.

2. Discussion of the Related Art

Chest scans obtained from high-resolution computed tomography (HRCT) scanners contain a wealth of data that is time consuming for physicians to interpret. For example, the number of slices acquired per patient in HRCT datasets makes it difficult for physicians to evaluate the extent of certain pulmonary diseases such as bronchiectasis, asthma or emphysema in a timely fashion.

These pulmonary diseases are characterized by abnormalities in airway dimensions, including airway wall thickness and lumen diameter. HRCT has become one of the primary means to depict these abnormalities as the availability of high-resolution near-isotropic data makes it possible to evaluate airways at angles that are oblique to a scanning plane. However, clinical evaluation of the airways is generally limited to visual inspection.

Although various tools have been developed to perform airway measurements such as airway wall thickness and lumen diameter, the majority of these tools rely on manual selection of points of interest. Further, even when fully automatic measurements are performed, such quantitative data is generally visualized in a two-dimensional (2D) fashion.

SUMMARY OF THE INVENTION

In an exemplary embodiment of the present invention, a method for visualizing airways in chest images, comprises: computing a distance map of a segmented bronchial tree; extracting data from the segmented bronchial tree using the distance map; and visualizing a three-dimensional (3D) image of the segmented bronchial tree color-coded according to the extracted data.

The method further comprises manually or automatically segmenting the bronchial tree. The method further comprises performing an adaptive region growing from a point in a trachea of the bronchial tree when the bronchial tree is automatically segmented. The data extracted from the segmented bronchial tree is an inner airway diameter or airway wall thickness of each airway in the bronchial tree.

The inner airway diameter is computed by: measuring a distance from each airway voxel to a closest point in a background of the distance-map; determining whether neighboring voxels have a greater distance; and assigning a largest distance of the voxel and its neighboring voxels to the voxel and its neighboring voxels, wherein the inner airway diameter corresponds to the largest distance. The airway wall thickness is computed by: estimating an outer diameter of the airway; and subtracting the inner airway diameter from the outer diameter of the airway, wherein the airway wall thickness corresponds to a result of the subtraction. Visualizing the 3D image of the segmented bronchial tree color-coded according to the extracted data comprises: assigning color values to the extracted data; and mapping the extracted data to the segmented bronchial tree according to their color values.

The method further comprises: selecting an airway in the visualization of the 3D image; and analyzing the extracted data in the selected airway. The method further comprises acquiring image data of the bronchial tree using a 3D imaging technique.

In an exemplary embodiment of the present invention, a system for visualizing airways in chest images, comprises: a memory device for storing a program; a processor in communication with the memory device, the processor operative with the program to: compute a distance map of a segmented bronchial tree; extract data from the segmented bronchial tree using the distance map; and visualize a 3D image of the segmented bronchial tree color-coded according to the extracted data.

The processor is further operative with the program to automatically segment the bronchial tree. When automatically segmenting the bronchial tree the processor is further operative with the program to perform an adaptive region growing from a point in a trachea of the bronchial tree. The data extracted from the segmented bronchial tree is an inner airway diameter or airway wall thickness of each airway in the bronchial tree.

When computing the inner airway diameter the processor is further operative with the program to: measure a distance from each airway voxel to a closest point in a background of the distance-map; determine whether neighboring voxels have a greater distance; and assign a largest distance of the voxel and its neighboring voxels to the voxel and its neighboring voxels, wherein the inner airway diameter corresponds to the largest distance. When computing the airway wall thickness the processor is further operative with the program to: estimate an outer diameter of the airway; and subtract the inner airway diameter from the outer diameter of the airway, wherein the airway wall thickness corresponds to a result of the subtraction. When visualizing the 3D image of the segmented bronchial tree color-coded according to the extracted data the processor is further operative with the program to, assign color values to the extracted data; and map the extracted data to the segmented bronchial tree according to their color values.

The processor is further operative with the program to visualize the extracted data of a selected airway. The processor is further operative with the program to receive image data of the bronchial tree from a 3D imaging device.

In an exemplary embodiment of the present invention, a method for interactively displaying multiple quantitative airway measurements within a bronchial tree extracted from chest image data, comprises: segmenting the bronchial tree; computing a distance map of the segmented bronchial tree; taking quantitative airway measurements along the segmented bronchial tree; displaying a version of the segmented bronchial tree color-coded according to the measurements; receiving an airway selection for local evaluation; and displaying a window including the quantitative airway measurements for the selected airway or taking additional quantitative measurements along the selected airway.

In an exemplary embodiment of the present invention, a system for visualizing airways in chest images, comprises: a scanning device for acquiring image data of a chest; and a visualization module for segmenting a bronchial tree in the image data; computing a distance map of the segmented bronchial tree; extracting data from the segmented bronchial tree using the distance map, and visualizing a 3D image of the segmented bronchial tree color-coded according to the extracted data.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
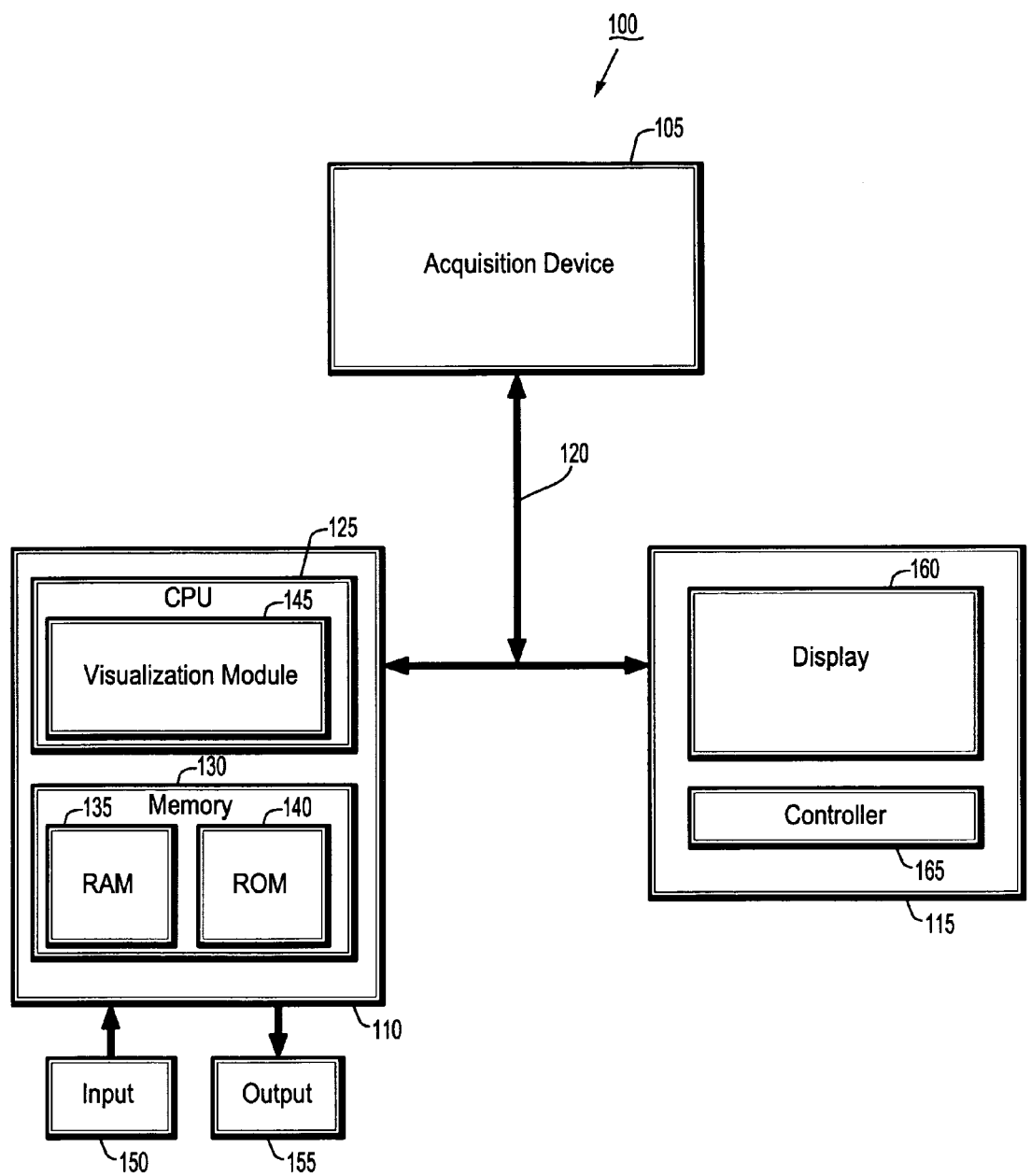
FIG. 1 is a block diagram of a system for visualizing airways for assessment according to an exemplary embodiment of the present invention.

FIG. 1 is a block diagram illustrating a system 100 for visualizing airways for assessment according to an exemplary embodiment of the present invention. As shown in FIG. 1, the system 100 includes an acquisition device 105, a PC 110 and an operator's console 115 connected over a wired or wireless network 120.

The acquisition device 105 may be a high-resolution computed tomography (HRCT) imaging device or any other three-dimensional (3D) high-resolution imaging device such as a magnetic resonance (MR) scanner.

The PC 110, which may be a portable or laptop computer, a medical diagnostic imaging system or a picture archiving communications system (PACS) data management station, includes a CPU 125 and a memory 130 connected to an input device 150 and an output device 155. The CPU 125 includes a visualization module 145 that includes one or more methods for visualizing airways for assessment to be discussed hereinafter with reference to FIGS. 2-4. Although shown inside the CPU 125, the visualization module 145 can be located outside the CPU 125.

The memory 130 includes a RAM 135 and a ROM 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by an LCD, CRT display, printer, etc.

The operation of the system 100 can be controlled from the operator's console 115, which includes a controller 165, e.g., a keyboard, and a display 160. The operator's console 115 communicates with the PC 110 and the acquisition device 105 so that image data collected by the acquisition device 105 can be rendered by the PC 110 and viewed on the display 160. The PC 110 can be configured to operate and display information provided by the acquisition device 105 absent the operator's console 115, by using, e.g., the input 150 and output 155 devices to execute certain tasks performed by the controller 165 and display 160.

The operator's console 115 may further include any suitable image rendering system/tool/application that can process digital image data of an acquired image dataset (or portion thereof) to generate and display images on the display 160. More specifically, the image rendering system may be an application that provides rendering and visualization of medical image data, and which executes on a general purpose or specific computer workstation. The PC 110 can also include the above-mentioned image rendering system/tool/application.

Figure 2:
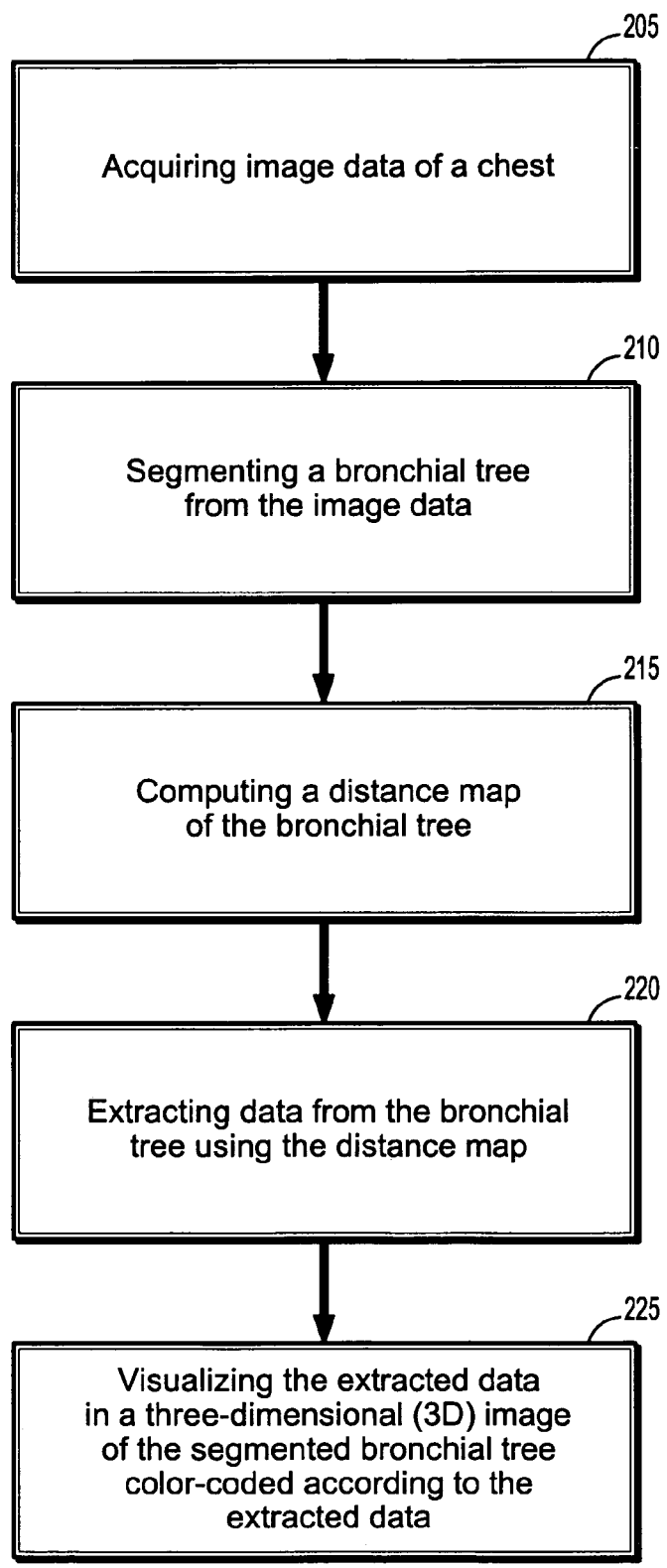
FIG. 2 is a flowchart illustrating a method for visualizing airways for assessment according to an exemplary embodiment of the present invention.

FIG. 2 is a flowchart illustrating a method for visualizing airways for assessment according to an exemplary embodiment of the present invention, As shown in FIG. 2, 3D image data of a bronchial tree is acquired from a patient (205). This is accomplished, e.g., by using the acquisition device 105, which is operated at the operator's console 115, to scan the patient's chest thereby generating a series of 2D image slices associated with the chest. The 2D image slices are then combined to form a 3D image of the bronchial tree.

After the 3D image data of the bronchial tree is acquired, the bronchial tree is segmented (210). The segmentation can be performed manually or automatically through several different methods. For example, the segmentation can be automatically performed as described in A. P. Kiraly, E. A. Hoffman, G. McLennan, W. E. Higgins, and J. M. Reinhardt, "3D human airway segmentation methods for virtual bronchscopy", Academic Radiology, vol. 9, no. 10, pp. 1153-1168, October 2002, and C. I. Fetita, F. Preteux, C. Beigelman-Aubry, and P. Grenier, "Pulmonary airways: 3-D reconstruction from multislice CT and clinical investigation", vol. 23, no. 11, IEEE Trans. Medical Imaging, November 2004. Copies of these references are incorporated by reference herein in their entirety.

In the method described in A. P. Kiraly, E. A. Hoffman, G. McLennan, W. E. Higgins, and J. M. Reinhardt, "3D human airway segmentation methods for virtual bronchscopy", Academic Radiology, vol. 9, no. 10, pp. 1153-1168, October 2002, a region growing and filtering are used to obtain the segmentation. The region growing starts from a seed point in the trachea that is automatically determined by labeling air-like regions around the center of first slices and looking for stability in region size across the slices. Size stability is determined using a tolerance $\xi$ on the size variation, $$S_{i+1} - S_i \xi,$$

with $S_i$ and $S_{i+1}$ being areas of slice i and i+1, respectively.

Given the segmented bronchial tree, a distance map of the segmented bronchial tree is computed (215). Quantitative data about the airways in the bronchial tree is then collected (220). This data can be collected manually or automatically. Several methods exist to obtain different quantitative values of the airways. Some examples of this data are inner airway diameters or radii and airway wall thickness.

Full-width half-maximum approaches as described in A. P. Kiraly, J. M. Reinhardt, E. A. Hoffman, G. McLennan, and W. E. Higgins, "Virtual Bronchoscopy for Quantitative Airway Analysis", SPIE Medical Imaging 2005: Physiology, Function, and Structure from Medical Images, SPIE Proceedings vol. 5746, February 2005, and S. Matsuoka, Y. Kubrihara, Y. Nakajima, H. Niimmi, H. Ashida, and K. Kaneoya, "Serial change in airway lumen and wall thickness at thin-section et in asymptomatic subjects", Radiology, 10 Dec. 2004 use gray level data to measure inner and outer airway wall diameters.

These methods require a center point to be automatically or manually defined. Copies of these references are incorporated by reference herein in their entirety.

Using the segmented bronchial tree, inner wall diameters can be automatically estimated by using the distance map of the segmentation. Examples of this are described in E. Pichon, C. L. Novak, A. P. Kiraly, D. P. Naidich, "A novel method for pulmonary emboli visualization from high-resolution CT images", SPI Medical Imaging 2004, 5367, 2004, and U.S. Patent Application. Publication No. 20050240094, entitled, "System and method for visualization of pulmonary emboli from high-resolution computed tomography images". In these examples, a label at the center is taken as the distance value, since each voxel on the surface of the bronchial tree follows the steepest descent to the center. Copies of these references are incorporated by reference herein in their entirety.

Further, the tree model as described in A. P. Kiraly, J. P. Helferty, E. A. Hoffman, G. McLennan, and W. E. Higgins, "3D Path Planning for Virtual Bronchoscopy", vol. 23, no. 11, IEEE Trans. Medical Imaging, November 2004, a copy of which is incorporated by reference herein in its entirety, can also be used as a basis for centering the location of the measurements.

Once the quantitative data has been collected, it is visualized in a 3D image of the segmented bronchial tree by fitting color-coded versions of the measured values into the segmentation (225). An example of fitting each measured value into the segmentation is described in U.S. Patent Application Publication No. 20060023925, entitled, "System and method for tree-model visualization for pulmonary embolism detection", a copy of which is incorporated by reference herein in its entirety. In this method, the fitting is done by assigning colors from a color table (e.g., 0-255) to the measured values, with larger values being assigned higher color values (e.g., red) and smaller values being assigned smaller color values (e.g., dark blue or purple), and then, mapping the color-coded values to the segmented bronchial tree by placing the values at the same locations in the segmented bronchial tree from where they were obtained. Hence, the segmentation is visually modified to reflect the values of the measurements.

Figure 3:
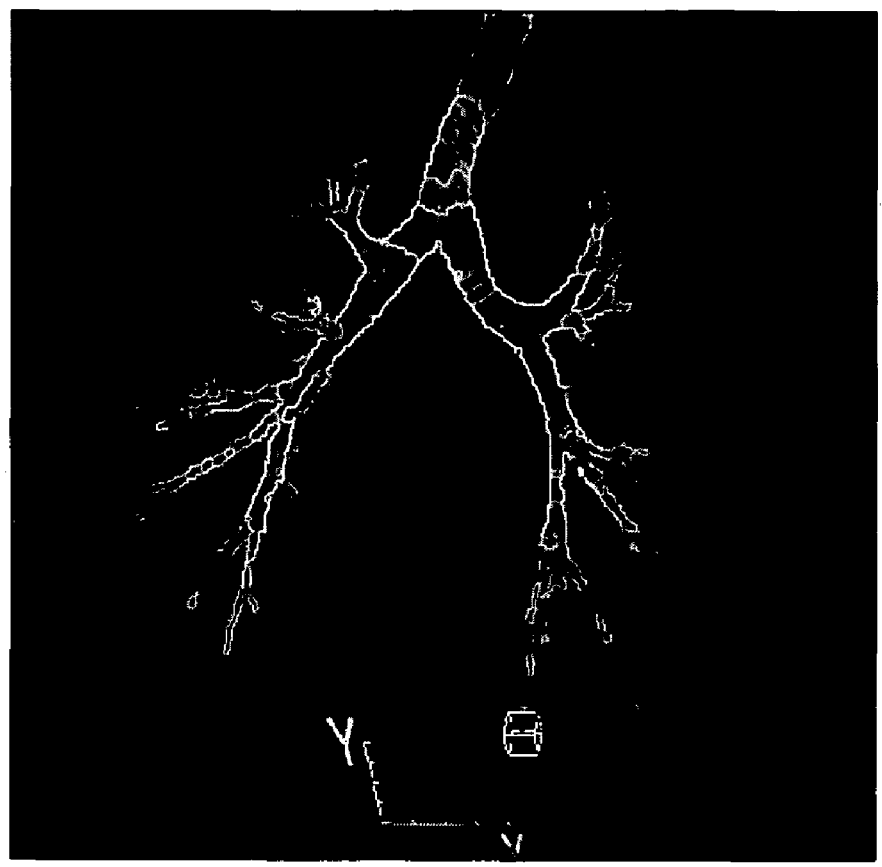
FIG. 3 is an image illustrating a bronchial tree color-coded according to an exemplary embodiment of the present invention.
Figure 4:
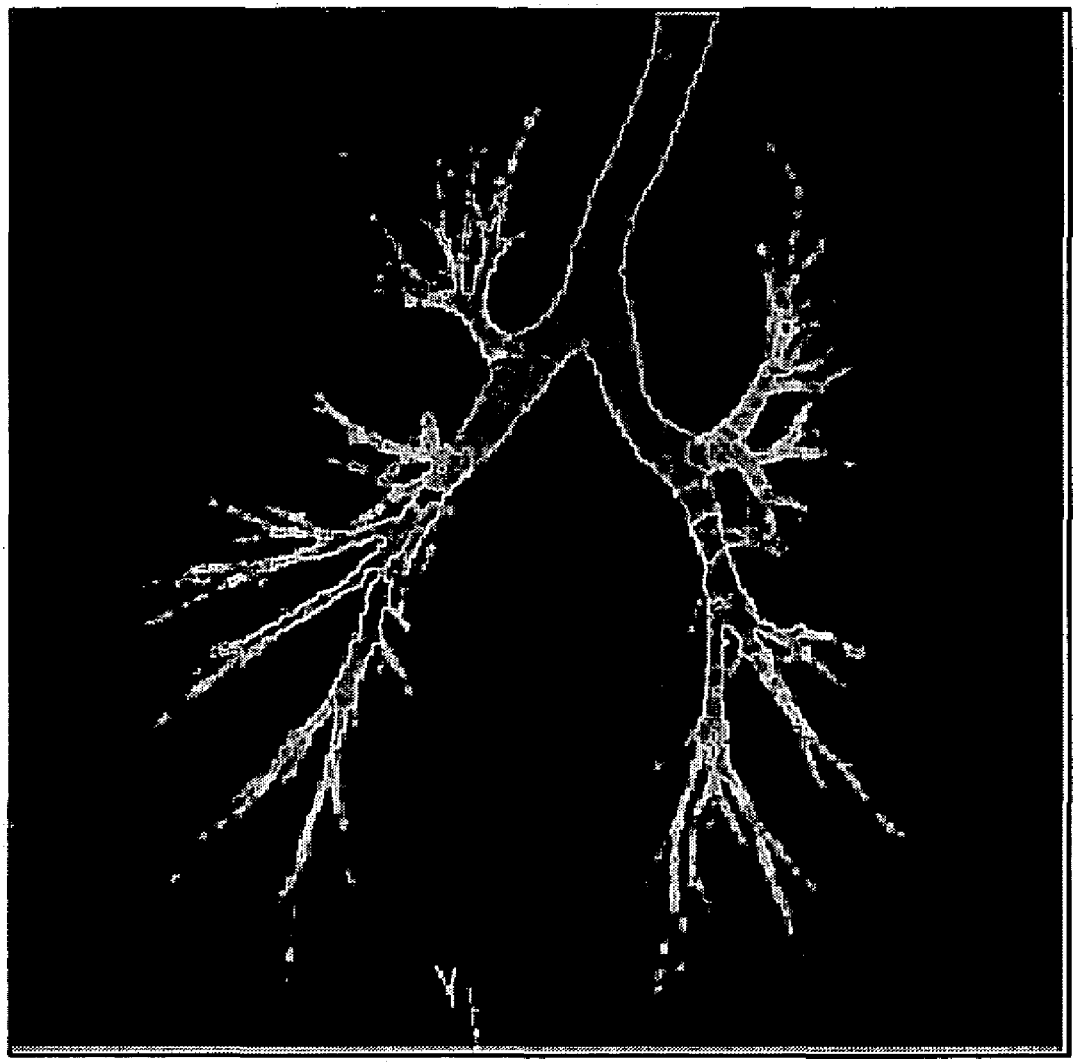
FIG. 4 is an image illustrating a bronchial tree color-coded according to an exemplary embodiment of the present invention.

An example of a method for visualizing airways for assessment according to an exemplary embodiment of the present invention is shown in FIGS. 3 and 4. Here, the airway segmentation was obtained using an adaptive region crowing. The measurements were done directly on the segmentation by measuring the distance from the surface to the segmentation center using the distance map. The measurements were then mapped to colors based on their values and placed at the same physical locations from where they were obtained.

FIG. 3 shows an airway tree for a patient with mild bronchiectasis with color-coding representing different diameters, ranging from red (e.g., >10 mm diameter) to violet (e.g., about 0.1 mm diameter). Since FIG. 3 is a black and white image, the color red generally indicates diameters near the trachea and the color violet generally indicates diameters of the airways branching from the main bronchi. The white box indicates an airway selected for local evaluation.

In an interface according to an exemplary embodiment of the present invention, a user can adjust the maximum diameter colored on the visualization with a slide bar. This allows a better use of the color range for the airways beyond the trachea and main bronchi and therefore makes it easier to find dilated or non-tapering airways throughout the bronchial tree. An example of this is shown in FIG. 4. Here, the same airway tree as shown in FIG. 3 is displayed with a lower diameter color limit. The excluded diameter points are colored gray (e.g., the trachea and most of the main bronchi) and the small airways show better color resolution.

As previously mentioned, in addition to diameters, other measurements such as wall thickness for use in detecting the presence of mucus plugs, or ratios with corresponding arterial diameters can be visualized in accordance with an exemplary embodiment of the present invention. Since this data is represented within the context of the airway tree it allows for a simple and intuitive interface. Any point clicked on the visualization can be immediately examined for further analysis. More details on the measurements or more thorough evaluations can be performed to gather additional information on the selected site. For example, when a user selects a suspicious point, the system automatically reports in real-time the cross-sectional airway diameter and wall thickness in a pop-up window.

According to an exemplary embodiment of the present invention, several different measurements can be visualized on the airway tree to allow for an interactive 3D model of quantitative data that can be queried and analyzed in a more intuitive fashion than a simple list of numbers of a final output of a classifier. Trends in the data can be easily realized since a user can view almost the entire dataset. The user interface also allows for more a thorough examination of the data at user-selected points.

It is to be understood that although a method for visualizing multiple quantitative measurements according to an exemplary embodiment of the present invention has been described with reference to the airways it can also be applied to other structures of the body such as the brain, lungs and kidneys.

It should to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A system for visualizing airways in a chest image, comprising:

a memory device for storing a program;

a processor in communication with the memory device, the processor operative with the program to:

compute a distance map of a segmented bronchial tree;

collect quantitative data about the airways in the segmented bronchial tree using the distance map, the quantitative data comprising an inner airway diameter or airway wall thickness of each airway in the bronchial tree using a full-width half maximum approach, the airway wall thickness being computed by estimating an outer diameter of the airway and subtracting the inner airway diameter from the outer diameter of the airway, wherein the airway wall thickness corresponds to a result of the subtraction;

visualize the quantitative data in a three-dimensional (3D) image of the segmented bronchial tree by fitting color-coded versions of the quantitative data to the segmented bronchial tree; and in response to a point on the 3D image of the segmented bronchial tree being selected, wherein the point corresponds to a first airway to be locally evaluated and the first airway does not pass perpendicularly through an axial plane of the chest image, the processor is further operative with the program to automatically:

determine a long axis of the first airway by computing eigenvectors of a Hessian matrix of original data around the point;

determine a plane of the first airway's true cross-section with the eigenvectors; and compute the first airway's inner and outer diameters at the point using the true cross-sectional plane by measuring a distance from each airway voxel to a closest voxel in the distance-map, determining whether neighboring voxels have a greater distance, and assigning a largest distance of the voxel and its neighboring voxels to the voxel and its neighboring voxels, wherein the inner airway diameter corresponds to the largest distance.

2. The system of claim 1, wherein the processor is further operative with the program to:

automatically segment the bronchial tree.

3. The system of claim 2, wherein when automatically segmenting the bronchial tree the processor is further operative with the program to:

perform an adaptive region growing from a point in a trachea of the bronchial tree.

4. The system of claim 1, wherein the processor is further operative with the program to:

receive image data of the bronchial tree from a 3D imaging device.

5. The system of claim 1, wherein the fitting comprises assigning colors from a color table to the quantitative data and mapping the color-coded quantitative data to the segmented bronchial tree, wherein the mapping comprises placing the color-coded quantitative data at the same location in the segmented bronchial tree from where the original quantitative data was obtained.

6. The system of claim 1, wherein the processor is further operative with the program to:

provide, in real-time, a pop-up window displaying the first airway's inner and outer diameters at the point.

* * * * *